United States Patent
Crosby et al.

[11] 3,976,790
[45] Aug. 24, 1976

[54] IONIC DIHYDROCHALCONE SWEETENERS AND FOOD PRODUCT CONTAINING THE SAME

[75] Inventors: Guy A. Crosby; Grant E. DuBois, both of Palo Alto, Calif.

[73] Assignee: Dynapol, Palo Alto, Calif.

[22] Filed: June 10, 1974

[21] Appl. No.: 477,744

[52] U.S. Cl.................................. 426/3; 426/590; 426/538; 426/650; 260/520 C
[51] Int. Cl.².......................................... A23G 3/30
[58] Field of Search................... 426/217, 213, 3–5, 426/590, 534, 538, 548, 650; 260/590, 520, 520 C

[56] References Cited
UNITED STATES PATENTS

| | | | |
|---|---|---|---|
| 3,739,064 | 6/1973 | Rizzi | 426/217 |
| 3,751,270 | 8/1973 | Rizzi | 426/548 |
| 3,821,417 | 6/1974 | Westall | 426/3 |

FOREIGN PATENTS OR APPLICATIONS

C1,196   10/1972   Hungary

*Primary Examiner*—Norman Yudkoff
*Assistant Examiner*—Martin G. Mullen
*Attorney, Agent, or Firm*—William H. Benz

[57] ABSTRACT

A group of novel dihydrochalcone compounds represented by the formula

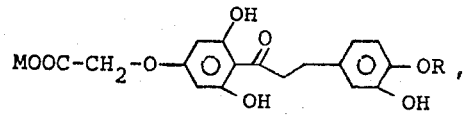

wherein M is hydrogen or a pharmacologically acceptable cation and R is a lower saturated alkyl of from 1 to 4 carbon atoms, and their use as sweetening agents in food products are disclosed.

25 Claims, No Drawings

IONIC DIHYDROCHALCONE SWEETENERS AND FOOD PRODUCT CONTAINING THE SAME

BACKGROUND OF THE INVENTION

Field of the Invention

This invention relates to compositions for imparting sweetness.

Reference to Related Application

This application is related to United States Patent Application Serial Number 477,730, filed of even date by the present inventors and concerning certain derivatives of dihydrochalcones, including those of this invention.

The Prior Art

There is a trend toward the use of more and more sweetening by the world's population. Primarily, this sweetening is obtained from sucrose. Sucrose has several medical disadvantages including high caloric content, which promotes obesity; an ability to cause dental caries; and non-tolerance by diabetics. Nonetheless, it is the consumer's sweetener of choice, the standard to which any synthetic alternative must compare. In sum, the ideal synthetic sweetener will taste like sucrose, without any extra accompanying tastes or aftertastes.

Saccharin, the most widely-used synthetic sweetener, is criticized by users for its undesirable bitter aftertaste. Similarly, the sweetener derived from the Synsepalum dulcificum berry, is disliked for its non-sucrose-like lingering sweetness.

Another required characteristic of a synthetic sucrose substitute is non-toxicity. It was the suspicion of carcinogicity which led to banning of the cyclamates, a once-popular group of sweeteners.

A class of sweeteners which has received good marks for non-toxicity are the dihydrochalcones. Initially, these materials were made by chemically modifying certain bitter components of several citrus fruits. Now, a variety of synthetically-derived materials have been proposed as well. These materials share a basic structure

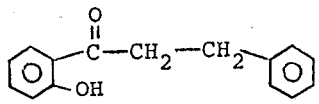

with great variety of groups substituted into the two aromatic rings. As pointed out in Horowitz and Gentili's U.S. Pat. Nos. 3,087,821, issued Apr. 30, 1963, and 3,583,894, issued June 8, 1971, and amplified in their chapter in the book Sweetness and Sweeteners, Birch, Green, and Coulson, Eds., Applied Science Publ., Ltd., London, pp. 69–79 (1971), the exact nature of the substituents and their placement on the molecule are critical. A change which is minor on its face may have a major effect on the taste properties of the dihydrochalcone. Many of the dihydrochalcones prepared heretofore have menthol-like aftertastes and prolonged sweet aftertastes. Some dihydrochalcones disclosed by Farkus, Negradi, Gollsegan and Antus in Hungarian Patent Application CT-1196, having a structure

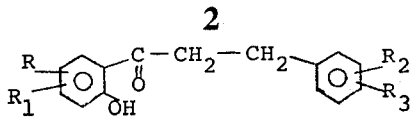

wherein R is hydrogen, hydroxyl, alkoxyl, or substituted alkoxyl, $R_1$ is hydrogen or a "hydrophylous" group such as carboxyl, sulfonyl, or phosphonyl, and $R_2$ and $R_3$ are hydrogen or alkoxyls, which are chemically related to the present invention, have been evaluated and found to have unpleasant aftertastes. They pose a second problem as well in that their sweetness, reltive to sucrose, is not immense. Although the best one is claimed to the 180 times as sweet as sugar, our tests indicate that this compound is only 76–81 times as sweet as sugar. Since the dihydrochalcones are relatively complex and likely expensive materials, it is desirable that a dihydrochalcone have a very high sweetening power, on the order of several hundred times that of sucrose, on a pound for pound basis, so that the amount used may be reduced.

STATEMENT OF THE INVENTION

A new group of dihydrochalcones which have highly desirable taste properties has now been discovered. These materials have the chemical structure

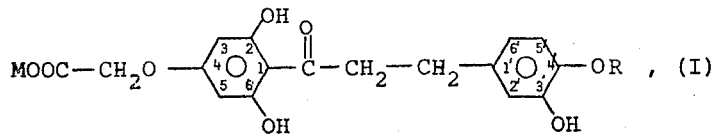

wherein M is hydrogen or a pharmacologically acceptable cation, for example $Na^+$ or $K^+$, and R is a lower saturated alkyl of one to four carbon atoms. They have tastes characterized by sucrose-like sweetness and no appreciable aftertaste or companion taste. On a weight basis, they are up to 500 or more times as sweet as sucrose. Compared to many dihydrochalcones proposed heretofore, they are very water-soluble so that intense sweet flavors can be generated.

DETAILED DESCRIPTION OF THE INVENTION

The Dihydrochalcones

The dihydrochalcones of this invention have a set chemical structure as shown in formula (I). They contain three hydroxyl groups which are placed at the 2, 6, and 3' positions. At the 4' position they contain a lower saturated alkoxy group selected from the group of methoxy, ethoxy, the propoxies, and the butoxies; preferably the 4' substituent is a methoxy or ethoxy, and most preferably, a methoxy. At the 4 position they contain a carboxyl group-substituted methoxy group wherein the carboxyl group is either present as a carboxylic acid group, COOH, or as a cation salt of a carboxylic acid. As cations in the salts may be employed any pharmacologically acceptable cation such as the alkali metal cations, alkaline earth cations, ammonium cations, and the pharmacologically acceptable 4th period transition metal cations such as zinc, copper and nickel cations. Preferred among these cations are the calcium cations and the alkali metal cations, especially sodium, potassium and lithium cations. It is most preferred when the carboxyl group of the 4' substituent is present either as the carboxylic acid group or as the sodium or potassium salt. Thus in formula (I), M most preferably is H, Na, or K.

Preparation

These dihydrochalcones may be produced by at least two routes. In one method, the corresponding 2,4,6-trihydroxydihydrochalcone is alkylated with an alkyl haloacetate and then treated with base to yield a mixture of 2, 4, and 3'-(carboxyl-substituted methoxy) dihydrochalcones, which are then separated. In another method, hesperetin or an equivalent other 4'-lower alkoxyl material is alkylated with an alkyl haloacetate and then opened and reduced to the desired dihydrochalcone. These two preparative schemes are demonstrated in the Examples, where reaction condition ranges and the like are also set out.

Use of the Dihydrochalcones

These dihydrochalcones find application as sweeteners. In this used they are admixed with edible substances such as foods, beverages, medicines, and the like, in amounts effective for imparting a desired degree of sweetness. The amount of dihydrochalcone employed can vary widely, just as the amount of natural sugar sweetener employed varies from person to person and food application to food application. As a general rule, the weight of dihydrochalcone added will be about 1/100th – 1/1000th the weight of sucrose required to yield the same sweetness. Thus, additions of from about 0.0001% up to about 0.05% by weight (basis edible substance) may be usefully employed. The present materials offer the advantage that their solubility permits such addition to most food systems.

The dihydrochalcones are added to the edible composition by mixing methods known in the art. The dihydrochalcones may be added as solids or as solutions. They may be used alone or as the primary sweetener in a composition, or they may be one of several sweeteners in the final composition; sucrose, or another natural sweetener or another synthetic sweetener also being added.

These dihydrochalcones, their preparation and their use are further described in the following Examples. These are to illustrate the invention and are not to be construed as limitations on this invention, which is instead defined by the appended claims.

EXAMPLE I

This Example describes the production of the dihydrochalcones of this invention via alkylation of corresponding 2,4,6-trihydroxydihydrochalcones.

A. 2,4,6-tribenzyloxyacetophenone is obtained by the common procedure of reacting 2,4,6-trihydroxyacetophenone with excess benzyl chloride and excess potassium carbonate in dimethylformamide and giving the reaction mixture an aqueous work up. 3-benzyloxy-4-n-propoxybenzaldehyde is similarly prepared from 3-hydroxy-4-n-propoxybenzyl alcohol, excess benzyl chloride and excess potassium carbonate. A warm solution of 2.19 g of the 2,4,6-tribenzyloxyacetophenone and 1.35 g of the benzyloxy-4-n-propoxybenzaldehyde is prepared in 10 ml of absolute ethanol. 15 Milliliters of warm aqueous 60% potassium hydroxide is added all at once. The mixture is stirred and a yellow solid product is formed. 16 Milliliters of absolute ethanol is added and the mixture is added to 300 ml of water and extracted three times with ethyl acetate. The extracts are dried and concentrated to yield 3.2 g of a solid, which is recrystallized to yield 2.6 g (75% yield) of 2,4,6,3'-tetrabenzyloxy-4'-n-propoxychalcone.

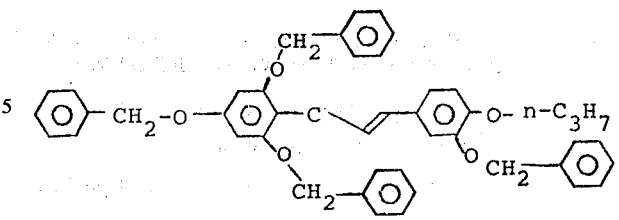

1.38 Grams of this material is dissolved in about 50 ml of ethyl acetate and 200 mg of 5% palladium on charcoal is added. The reaction flask is flushed with hydrogen and then the mixture is stirred under hydrogen at room temperature for about 35 hours. The product is checked by thin layer chromatography and observed to contain essentially a single product. The reaction mixture is filtered and concentrated to yield 0.66 g of a colorless oil, which by NMR is determined to be 2,4,6,3'-tetrahydroxy-4'-n-propoxy dihydrochalcone,

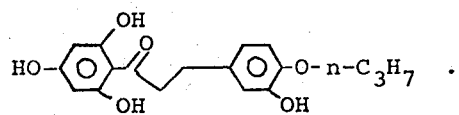

B. The preparation of part A is substantially repeated with one change: Instead of 3-benzyloxy-4-n-propoxy benzaldehyde, 3-benzyloxy-4-methoxybenzaldehyde (prepared from 3-hydroxy-4-methoxybenzyl alcohol) is employed as starting material. The final product is 2,4,6,3'-methoxy dihydrochalcone

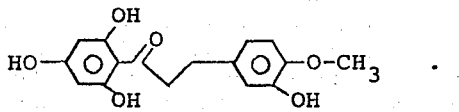

The reactions depicted in parts A and B have been run under very mild conditions. The reaction between the acetophenone and the benzaldehyde could be run at somewhat elevated temperatures, say from room temperature (20°C) up to about 75°C, if desired. Also, any strong base could be employed, such as sodium hydroxide, lithium hydroxide, or tetramethylammonium hydroxide. The hydrogenation may be carried out catalytically as shown, in the presence of a suitable transition metal or precious metal catalyst and molecular hydrogen at pressures from atmospheric up to as much as about 100 psig and temperatures of from about room temperature (20°C) to about 125°C; or it may be carried out by reaction with a hydrogen-carrying agent such as diimide.

C. The product of part B is alkylated. A solution-suspension of 1.5 g of the product of part B and 1.4 g of anhydrous potassium carbonate is prepared in 12.5 ml of dimethylformamide. While stirring, 680 mg of ethylchloroacetate is added and rinsed in with 7–8 ml of dimethylformamide. The mixture is stirred at room temperature overnight and poured into about 100 ml of water. This mixture is saturated with sodium chloride and extracted with ethylacetate. The extracts are washed, dried, and concentrated to yield a mixture of components. This mixture is purified by preparative thin layer chromatography to yield three major alkylation products:

2,4,3'-trihydroxy-6-carbethoxymethoxy-4'methoxy dihydrochalcone, 2,6,3'-trihydroxy-4-carbethoxymethoxy-4'methoxy dihydrochalcone, and 2,3'-dihydroxy-4,6-dicarbethoxymethoxydihydrochalcone. The desired 2,6-3'-trihydroxy-4-carbethoxymethoxy material unfortunately comprises only about one-fourth of the total of these three compounds.

D. The three compounds of part C are then separately contacted with aqueous base. In a typical reaction, excess 5% potassium hydroxide is added to the 2,6,3'-trihydroxy compound and swirled and permitted to stand overnight to give a green solution of the potassium salt of the 2,6,3'-trihydroxy material. The potassium salt solution is rendered acidic (to pH 2) with hydrochloric acid, and a white precipitate forms. This precipitate is separated, washed, analyzed, and found to be essentially pure 2,6,3'-trihydroxy-4-carboxymethoxy-4'-methoxydihydrochalcone

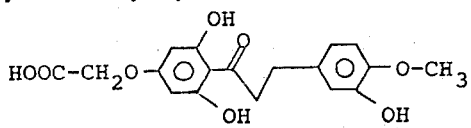

Cation salts such as the potassium, sodium, lithium, or ammonium salts are formed from this acid by titration of the acid with the appropriate base.

E. Aqueous solutions (0.009% by weight) of a variety of the products and intermediates of this examples are formed. They are tested by volunteers to determine their organoleptic properties, with the following results:

| Compound | Taste Observed |
|---|---|
| ![HO-phenyl(OH)(OH)-CO-CH2-phenyl-O-CH3] | Moderately sweet * |
| ![HO-phenyl(OH)(OH)-CO-CH2-phenyl-O-n-C3H7] | Tasteless |
| ![HOOC-CH2O-phenyl(OH)-CO-CH2-phenyl(OH)-O-CH3] | Extremely sweet, without linger or aftertaste |
| ![NaOOC-CH2O-phenyl(OH)-CO-CH2-phenyl(OH)-O-CH3] | Extremely sweet, clear, no aftertaste.** |
| ![COOH-CH2O-phenyl(OH)(O-CH2COOH)-CO-CH2-phenyl(OH)-O-CH3] | Tasteless |

As can be seen from the above taste data, the compounds of the present invention have desirable sweetener properties.

\* This compound had good sweetness but was so insoluble in water that a 0.009% solution could not be simply made up and thus its usefulness as a sweetener would be minimal.

\*\* In a second, more precise comparison taste test, this material is found to be 480–500 times as sweet as sucrose on a pound for pound basis. In a blind study, it is found to be more "sugar-like" in taste than sucrose itself.

EXAMPLE II

A solution of 1.5 g of hesperetin (Sigma Chemical Co.) and 6.1 g of ethylchloroacetate in 20 ml of dimethylformamide is prepared. To this is added 690 mg of anhydrous $K_2CO_3$. The mixture is flushed with argon and stirred for 17 hours at room temperature. The product of the reaction is added to about 200 ml of water, acidified to pH 2 with hydrochloric acid, and extracted with ethylacetate. The extracts are dried and concentrated. The concentrate is placed on a preparative thin layer chromatography plate and eluted with dichloromethane:methanol (95:5). A fraction is separated and determined to be hesperetin-7-carbethoxy methyl ether

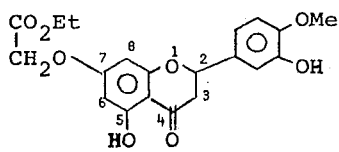

To a solution of 242 mg of hesperetin-7-carbethoxy methyl ether in 5 ml of 5% potassium hydroxide is added 25 mg of 5% palladium on charcoal. The resultant solution-suspension is flushed with hydrogen and stirred under a hydrogen atmosphere for 24 hours. It is then filtered through celite and acidified with 10% HCl. The resultant precipitate is recrystallized from benzene-methanol to give 198 mg of 2,6,3'-trihydroxy-4-carboxymethoxy-4'-methoxydihydrochalcone as colorless needles. This product has the desirable sweetness properties set forth in Example I. It is used to sweeten a variety of edible compositions, suitable sweetness resulting when:

0.09% w of the dihydrochalcone is added to an otherwise sweetener-free soft drink base;

0.05% w of the product is added to a gelatin dessert base containing ½ its normal amount of sugar;

0.008% w of the product is added with 0.008% of saccharin (less than ½ the normal amount) to a chewing gum composition; and 0.008% w of the product is added as the sole sweetener in a cough elixer.

Comparative Experiment

A pair of compounds chemically similar to the compounds of this invention, disclosed in Hungarian Patent Application CI-1196, and having the following structure

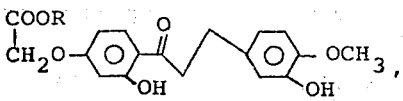

wherein R is H and Na respectively, are prepared in four steps, starting with condensation (42%) of commercially available 2,4-dihydroxyacetophenone and isovanillin. The resultant chalcone is hydrogenated (40%) to the dihydrochalcone, which is then selectively alkylated (41%) with ethyl chloroacetate. Hydrolysis (100%) of this ethyl ester with aqueous base, followed by acidification, then gives the desired compound (R=H). Titration with NaOH gives the R=Na compound.

Taste analysis of these compounds by a panel of investigators indicates the (R=H) material to have 76 times the sweetness of sucrose and the (R=Na) material to have 81 times the sweetness of sucrose (both on a weight basis). Panel members also indicate the presence of significant amounts of other tastes (i.e., bitter, salty) in both materials.

We claim:

1. A sweetened edible product comprising an edible material and in intimate admixture therewith, a compound of the structural formula

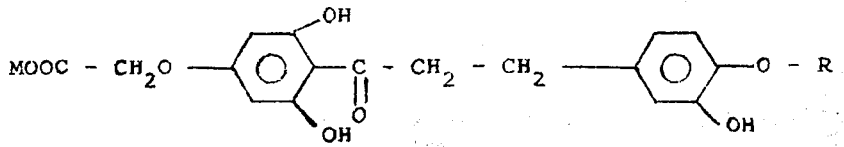

wherein M is selected from the group of hydrogen and cations, and R is a lower saturated alkyl of from 1 to 4 carbon atoms, in an amount of from 0.0001% to 0.5% by weight (basis material) effective to produce a desired sweetness sensation.

2. The sweetened edible product of claim 1 wherein R is methyl and wherein M is selected from the group consisting of hydrogen, calcium cation and the alkali metal cations.

3. The sweetened edible product of claim 2 wherein the amount of compound employed is from 0.001 to 0.01% by weight, basis material.

4. The sweetened edible product of claim 2 wherein said edible material is a soft drink.

5. The sweetened edible product of claim 2 wherein said edible material is chewing gum.

6. Compounds of the structural formula

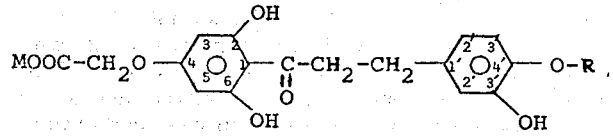

wherein M is selected from the group of hydrogen and cations, and R is a lower saturated alkyl of from 1 to 4 carbon atoms.

7. The compounds of claim 1, wherein R is methyl.

8. The compounds of claim 1, wherein R is ethyl.

9. The compounds of claim 1, wherein R is n-propyl.

10. The compounds of claim 1, wherein M is a cation selected from the group of calcium cations and the alkali metal cations.

11. The compounds of claim 10, wherein R is methyl.

12. The compounds of claim 10, wherein R is ethyl.

13. The compounds of claim 11, wherein R is n-propyl.

14. The compounds of claim 1, wherein M is potassium.

15. The compounds of claim 14, wherein R is ethyl.

16. The compounds of claim 14, wherein R is n-propyl.

17. The compounds of claim 1, wherein m is sodium.

18. The compounds of claim 17, wherein R is ethyl.

19. The compounds of claim 17, wherein R is n-propyl.

20. The compounds of claim 1, wherein M is hydrogen.

21. The compounds of claim 20, wherein R is ethyl.

22. The compounds of claim 20, wherein R is n-propyl.

23. The sweet dihydrochalcone

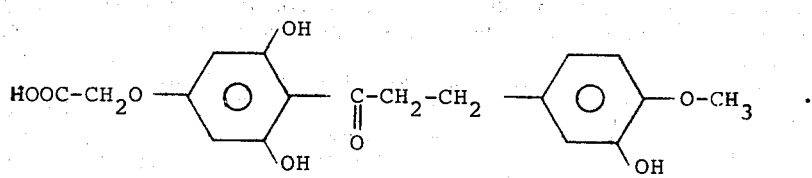

24. The sweet dihydrochalcone
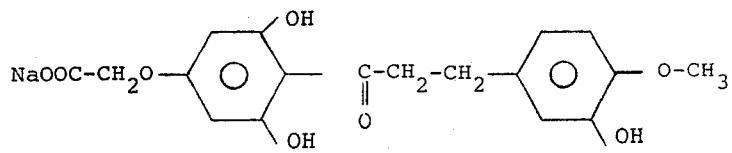
25. The sweet dihydrochalcone
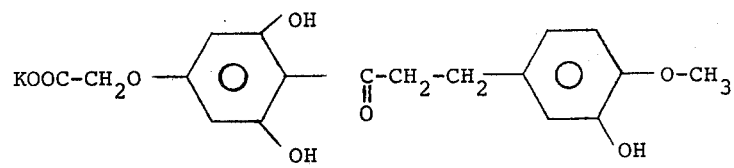
* * * * *